US010281296B2

(12) United States Patent
MacNeille et al.

(10) Patent No.: US 10,281,296 B2
(45) Date of Patent: May 7, 2019

(54) METHOD AND APPARATUS FOR ELECTRIC VEHICLE TRIP AND RECHARGE PLANNING (71) Applicant: FORD GLOBAL TECHNOLOGIES, LLC, Dearborn, MI (US)

(72) Inventors: Perry Robinson MacNeille, Lathrup Village, MI (US); Oleg Yurievitch Gusikhin, West Bloomfield, MI (US); David Allen Kowalski, Toledo, OH (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/343,964

(22) Filed: Nov. 4, 2016

(65) Prior Publication Data

US 2017/0074677 A1 Mar. 16, 2017

Related U.S. Application Data (63) Continuation of application No. 14/157,056, filed on Jan. 16, 2014, now Pat. No. 9,488,493.

(51) Int. Cl.
*B60L 9/00* (2006.01)
*G01C 21/36* (2006.01)
*G01C 21/34* (2006.01)
(52) U.S. Cl.
CPC ..... *G01C 21/3697* (2013.01); *G01C 21/3469* (2013.01)

(58) Field of Classification Search
CPC ........ G01C 21/00; G01C 21/36; G01C 21/26; G01C 21/3697; B60W 20/00; B60W 10/08; B60W 10/06; Y02T 10/7005; Y02T 90/14; Y02T 90/121; Y02T 90/16; Y02T 10/7291
(Continued)

(56) References Cited

U.S. PATENT DOCUMENTS

| 5,487,002 A | 1/1996 | Diller et al. |
| 5,790,976 A | 8/1998 | Boll et al. |

(Continued)

FOREIGN PATENT DOCUMENTS

| WO | 2009068783 A2 | 6/2009 |
| WO | 2010033517 A2 | 3/2010 |

(Continued)

OTHER PUBLICATIONS

Chinese Patent Office, Office Action for the corresponding Chinese Patent Application No. 201410742780.7, dated Dec. 5, 2017.
(Continued)

*Primary Examiner* — Shardul D Patel
(74) *Attorney, Agent, or Firm* — Frank Lollo; Brooks Kushman PC (57) ABSTRACT

A vehicle includes a traction battery, an interface, and at least one processor configured to present, via the interface, a message including a charge-vehicle recommendation for at least one charge station within the drive range, in response to (i) a selected destination for the vehicle lacking a charge facility for the battery and being within a drive range of the vehicle and (ii) a charge station being within the drive range.

9 Claims, 5 Drawing Sheets (58) Field of Classification Search
USPC .......................... 701/1, 22, 29, 30, 400, 533
See application file for complete search history.

(56) References Cited

U.S. PATENT DOCUMENTS

| | | | |
|---|---|---|---|
| 5,913,917 A | 6/1999 | Murphy | |
| 6,487,477 B1 | 11/2002 | Woestman et al. | |
| 6,864,807 B2 | 3/2005 | Todoriki et al. | |
| 7,659,698 B2 | 2/2010 | Elder et al. | |
| 7,719,232 B2 | 5/2010 | Kelty et al. | |
| 7,783,417 B2* | 8/2010 | Vavrus | G01C 21/3469 701/423 |
| 9,744,873 B2 | 8/2017 | Riley et al. | |
| 2003/0167120 A1* | 9/2003 | Kawasaki | G01C 21/3682 701/426 |
| 2007/0294026 A1 | 12/2007 | Schirmer | |
| 2008/0125958 A1* | 5/2008 | Boss | G01C 21/3469 701/123 |
| 2008/0221787 A1 | 9/2008 | Vavrus | |
| 2008/0275644 A1 | 11/2008 | MacNeille et al. | |
| 2009/0082957 A1 | 3/2009 | Agassi et al. | |
| 2009/0157289 A1* | 6/2009 | Graessley | B60L 3/12 701/123 |
| 2010/0057357 A1* | 3/2010 | Miyata | G01C 21/3614 701/533 |
| 2010/0063668 A1 | 3/2010 | Zhang et al. | |
| 2010/0094496 A1* | 4/2010 | Hershkovitz | B60L 3/12 701/22 |
| 2010/0106401 A1 | 4/2010 | Naito et al. | |
| 2010/0138098 A1* | 6/2010 | Takahara | B60L 11/123 701/31.4 |
| 2010/0138142 A1 | 6/2010 | Pease | |
| 2011/0016063 A1 | 1/2011 | Pollack et al. | |
| 2011/0060495 A1 | 3/2011 | Kono et al. | |
| 2011/0060517 A1 | 3/2011 | Kono et al. | |
| 2011/0224900 A1* | 9/2011 | Hiruta | G01C 21/3469 701/533 |
| 2011/0238287 A1* | 9/2011 | Hayashi | G01C 21/3682 701/532 |
| 2013/0030630 A1 | 1/2013 | Luke et al. | |
| 2013/0238162 A1 | 9/2013 | Kobayashi et al. | |
| 2013/0261860 A1 | 10/2013 | Oyama et al. | |
| 2013/0345976 A1 | 12/2013 | Li et al. | |
| 2014/0129139 A1* | 5/2014 | Ellison | G01C 21/3469 701/533 |
| 2015/0045985 A1* | 2/2015 | Yenamandra | G01C 21/3679 701/1 |
| 2015/0069969 A1* | 3/2015 | Wu | H02J 7/0047 320/109 |

FOREIGN PATENT DOCUMENTS

| | | |
|---|---|---|
| WO | 2011021776 A2 | 2/2011 |
| WO | 2011035427 A1 | 3/2011 |

OTHER PUBLICATIONS

Chinese Patent Office, Office Action for the corresponding Chinese Patent Application No. 201510023710.0, dated Dec. 19, 2017.

* cited by examiner

METHOD AND APPARATUS FOR ELECTRIC VEHICLE TRIP AND RECHARGE PLANNING

CROSS-REFERENCE TO RELATED APPLICATION

This application is a continuation of U.S. application Ser. No. 14/157,056, filed Jan. 1, 2014, now U.S. Pat. No. 9,488,493, which application is hereby incorporated by reference in its entirety.

TECHNICAL FIELD

The illustrative embodiments generally relate to a method and apparatus for electric vehicle trip and recharge planning.

BACKGROUND

Battery electric vehicles (BEVs) are being championed by many governments, OEMs, and some startup companies and entrepreneurs. It is expected that many BEVs will be deployed within a year or so in the US and other countries to ascertain the potential viability of the vehicles for personal transportation.

Because of the generally short driving range of BEVs, ready accessibility of charging facilities and/or battery-supply infrastructure will be a prerequisite for developing a mature BEV-based transportation system. In addition, more careful planning on the part of the drivers will be helpful to avoid being stranded due to drained batteries.

SUMMARY

In a first illustrative embodiment, a vehicle includes a traction battery, an interface, and at least one processor configured to present, via the interface, a message including a charge-vehicle recommendation for at least one charge station within the drive range, in response to (i) a selected destination for the vehicle lacking a charge facility for the battery and being within a drive range of the vehicle and (ii) a charge station being within the drive range.

In a second illustrative embodiment, a vehicle includes a traction battery, an interface, and at least one processor configured to identify charging stations within a range reachable on a current electric vehicle charge. The processor is also configured to query a database to find time-from-route and current wait-times for each charging station. The processor is further configured to present identified charging stations, including the time-from-route and wait-times for each station, in a selectable manner on the interface. Also, the processor is configured to receive a charging station selection and communicate with the selected charging station to schedule recharging In a third illustrative embodiment, a method executed by a vehicle-based processor in communication with a vehicle interface and provided in a vehicle including a traction battery includes identifying charging stations within a range reachable on a current electric vehicle charge. The method also includes querying a database to find time-from-route and current wait-times for each charging station. Also, the method includes presenting identified charging stations, including the time-from-route and wait-times for each station, in a selectable manner on the vehicle interface. The method further includes receiving a charging station selection and communicating with the charging station to schedule recharging.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
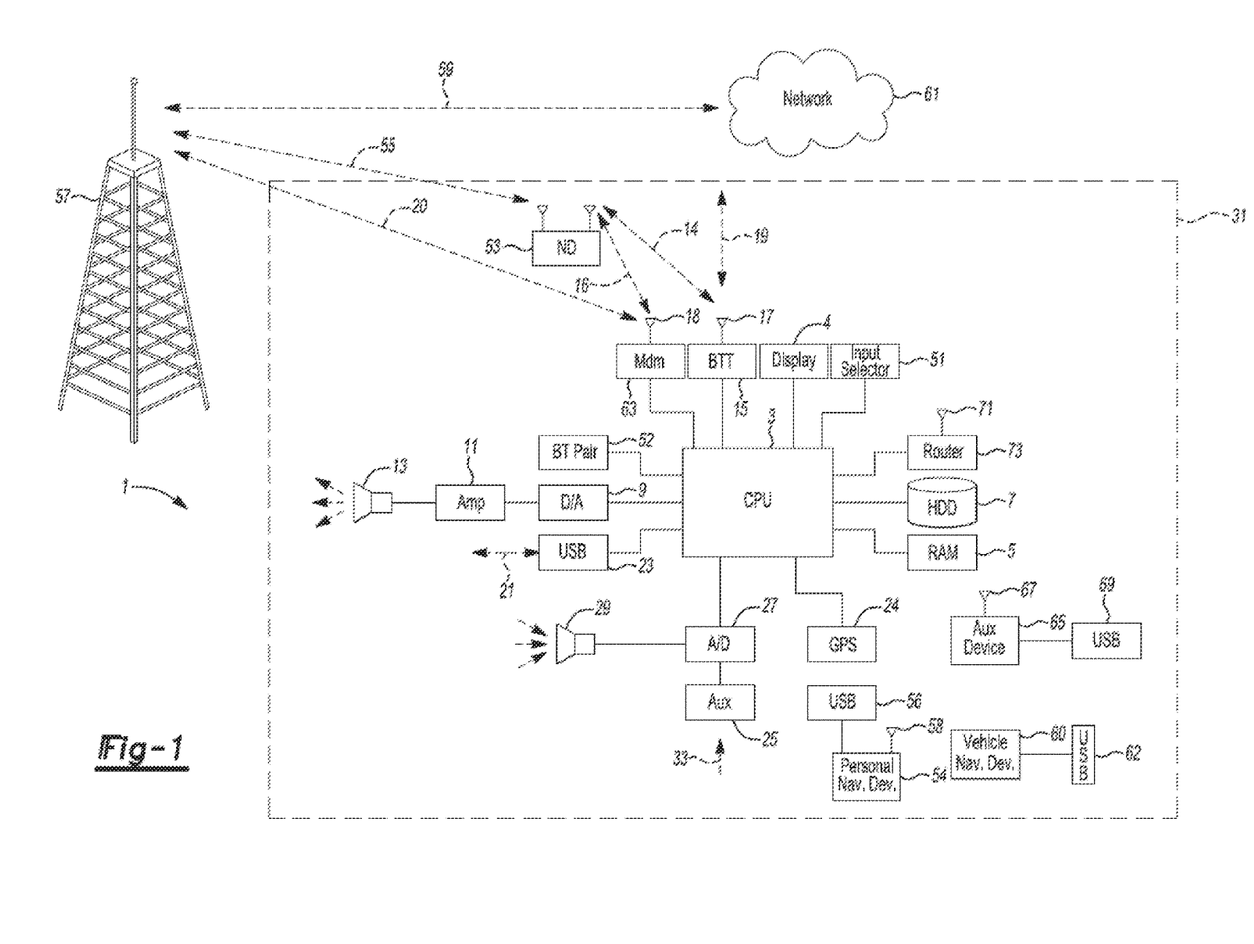
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a universal serial bus (USB) input 23, a global positioning system (GPS) input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a controller area network (CAN) bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as personal navigation device (PND)

54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, personal digital assistant (PDA), or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the central processing unit (CPU) is instructed that the onboard BLUETOOTH transceiver will be paired with a BLUETOOTH transceiver in a nomadic device.

Data may be communicated between CPU 3 and network 61 utilizing, for example, a data-plan, data over voice, or dual-tone multi-frequency (DTMF) tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domain Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

A driver-assistance system is needed to inform the driver of the driving range, and to help ensure that the driver can plan his/her trip to reach his/her destination and back in a cost/time effective manner. Furthermore, the driver-assistance system can transmit information about the vehicle location, vehicle and battery type to a battery recharging or swapping station, which can then develop efficient logistics to best serve the vehicle as necessary, and in the case where the vehicle is stranded due to battery drainage, dispatch a mobile unit to exchange the drained battery with a fully charged one.

Prototypes of the Emotive Driver Assistance System (EDAS) can provide a framework for a driver-assistance system for BEVs, as can other vehicle computing systems. EDAS provides easy access to information from the driver, from navigation systems, from the Internet and from the drivetrain and chassis systems. It is able to learn the driver's preferences and output concise information at appropriate times when the driver is prepared to receive it and when it is useful for making a decision. The system architecture and implementation of vehicle computing systems may allow the insertion of new software or hardware devices that can take advantage of the existing infrastructure.

Such a software device is proposed by the illustrative embodiments to assist BEV owners and increase their satisfaction with their vehicles. EDAS or another VCS will supply the device with filtered information from the several sources so that only relevant data is considered. The data is analyzed in the software device to produce useful information that is displayed using a display, spoken dialog system and avatar.

When the BEV is started with a key, a VCS may ask the driver: "What is the plan?" Because planning may be very important to BEV drivers, this establishes a planning habit that will be necessary for the driver to enjoy the vehicle. The driver may say "I need to go to the bank, the park and the beach." The VCS may respond by saying, "I don't have enough charge for that. Could we get a charge at the beach first, then the park and then the bank?" The driver might say "How long do you need to charge at the beach?" and the car would say "One hour." The driver would say "That will be fine. Would you reserve a charging station at the beach?" The VCS would then make the reservation over the Internet.

To determine the driving range of the vehicle, a separate powertrain system analysis tool will be used. The input data for this tool will be provided by (1) information regarding the state of charge of the battery, the vehicle speed and acceleration, and the ambient wind and temperature that can influence the battery performance and draining rate, and (2) information on vehicle location, travel direction relative to the wind, and terrain gradient encountered by the vehicle in its present and anticipated traveling direction. If the driver has input the travel destination, then the tool will determine the expected driving range relative to the destination. If the driver does not input a specific destination, then the analysis tool will determine the periphery of, for example, without limitation, 80% of the estimated driving range in different directions relative to the vehicle location. This periphery will be constantly updated, and as the driving range decreases, the periphery of the actual driving range will be estimated.

The EDAS will output a range indication that ensures the driver has a geographic visualization of the available range (see figures). It also provides the driver with the following functions: 1) the location of nearest battery charging and/or swapping stations, 2) recharging and battery swapping facility reservation system, 3) a method of requesting mobile battery swap/charge, 4) advance warning of an impending charge depletion, 5) automatic call for an emergency mobile recharge/swap.

The device also provides aggregated information, perhaps on a webpage, about BEVs to service providers, infrastructure planners, infrastructure operators, etc. This information can be used for several purposes, such as, but not limited to: locating concentrations of BEVs such as at sporting events where mobile battery swapping facilities may be needed; location of soon-to-be stranded vehicles that will need a mobile battery swap or a vehicle swap; locating clusters of dwellings with BEV so that facilities can be capitalized and built to service those locations; a way of advertising charging stations that home owners will provide as a service to BEV owners; and a method of locating vehicles for targeted marketing and stocking dealerships.

Figure 2:
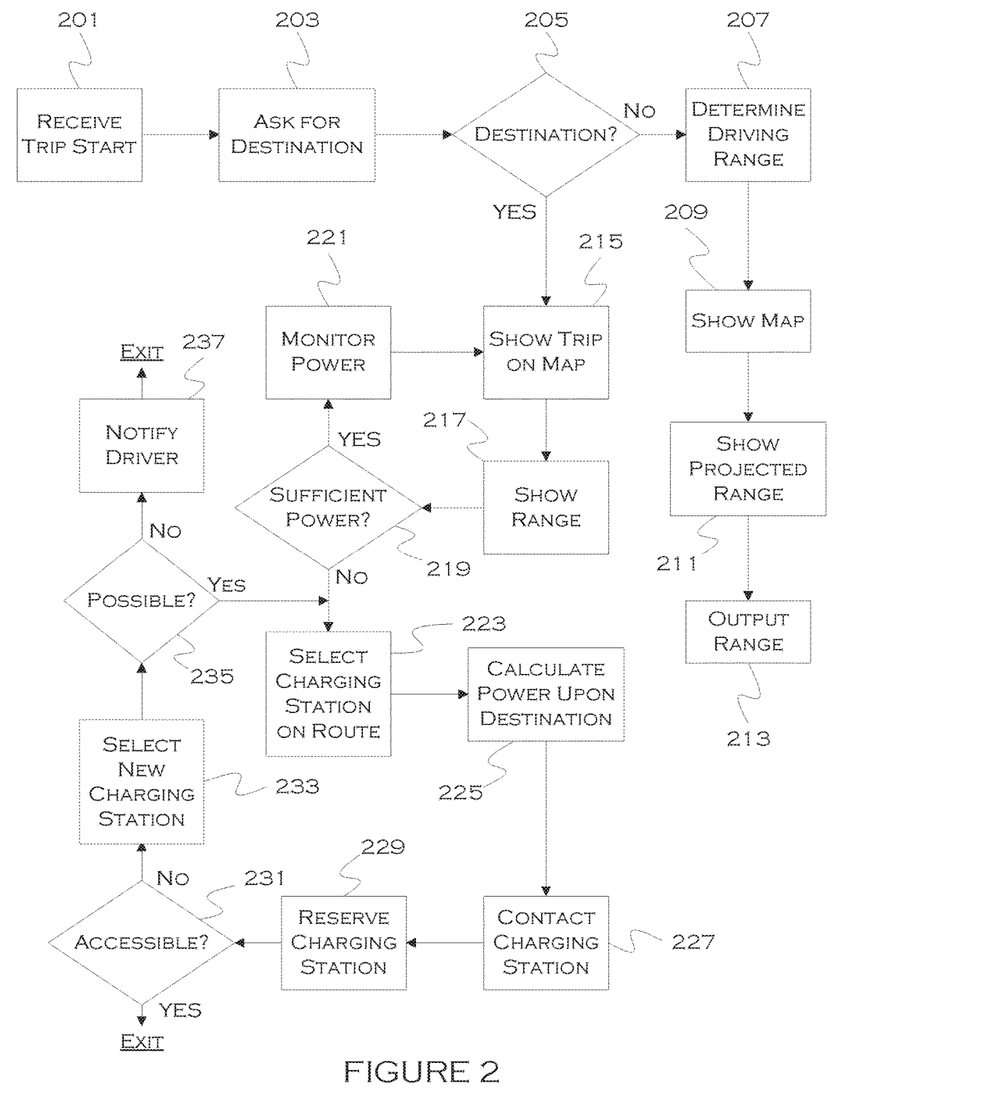
FIG. 2 shows an illustrative example of an attainable trip calculation process.

FIG. 2 shows an illustrative example of an attainable trip calculation process. In this illustrative embodiment, the process can show a projected range of travel for an electric vehicle, or it can show a trip including projected likelihood of reaching an input destination. Also, in the event that the vehicle does not have sufficient power to reach a selected destination, the process can recommend a charging station and/or schedule a recharge session at the station.

The process receives an indication that a trip is about to begin 201. This can be, for example, the start of an ignition, a driver indication that a trip is underway, the input of a destination, or any other suitable indicia. In this example, assuming a destination has not already been entered, the process can ask the driver for an intended destination 203. The driver has the option to input a destination 205, or, if the driver has no destination in mind 205, the process can proceed to determine a driving range based on current power available in the vehicle battery(s) 207.

When the vehicle is displaying a driving range, if there is no destination present, the process will show a map, which, in this example, is zoomed out enough to include the travelable range of the vehicle to be displayed 209. The map could be zoomed in further or out further as needed or desired. In addition to showing the map, the process also shows a projected range 211. This graphic demonstrates to a vehicle operator how far, in a particular direction, the vehicle is estimated to be capable of traveling. Included with the display, a projected range can be output 213, in case the map display is unclear. The projected range may also be a range that represents some percentage of the power remaining, as opposed to all the power remaining, in order to compensate for possible errors in the estimation. In at least one embodiment, the range is calculated based on a few routes in varying directions, and then the "range" in between those routes is displayed by connecting the calculated points.

If a destination has been input, the process may show the trip on a displayed map 215. Included in the trip display, there can be a display of the travelable range of the vehicle 217. For example, if the range is not sufficient to reach the destination, the projected range could be displayed along the route, with a marker where power may be low or projected to be out.

If there is sufficient power to reach a destination 219, or at least a leg of a destination, the process may continue to monitor the power situation 221 and display the trip and power status. This can be useful if unexpected drains in power occur, due to, for example, without limitation, weather, accessory usage, temperatures, traffic, etc.

If there is not sufficient power to reach an input destination, the process will find a charging station along or near the route and select the station for use in charging the vehicle 223. Since the power station is selected as a point where power should be less than zero, the process will calculate remaining power upon reaching the station 225 and/or calculate power needed to complete a journey. Power needed to complete a journey can include the round trip, in a single direction, to reach a next station, etc.

Current power stations are often equipped with the capability to have spots reserved in advance. Since power recharge often takes longer than gasoline fill ups, such reservations can be useful to secure a spot at the station when a driver arrives. This can also aid the station in planning how to handle incoming traffic. In this illustrative example, the process can contact 227 the travel station planned as a destination in order to reserve a recharging bay or battery swap time 229.

Contact with the charging station can be made in any appropriate manner. For example, if a phone is wirelessly connected to a vehicle computing system, the process can use the phone or the vehicle computing system through the phone to contact the charging station. WiFi or any other suitable protocol for sending messages to a remote source may also be used.

Once the reservation is attempted, the process determines if the requested bay/swap/station is accessible 231. For example, if there is no opportunity to make a reservation, the process may reject the first attempted station and instead select a different charging station that fits within a route profile (e.g., near the route, within a reachable distance on a current charge, etc.) 233.

If there is at least one charging station that fits defined criteria (for example, without limitation, close enough to the route, along the route, within a reachable distance, not too far of a detour, etc.), the process will select that charging station. If there is not a possible charging station 235, the process can alert the driver 237 so that the driver knows the destination is not likely reachable and no criteria-fitting charging stations exist on the route. The criteria for charging stations can be set by an original equipment manufacturer (OEM), by a driver, by a passenger or based on any other suitable determination.

Figure 3:
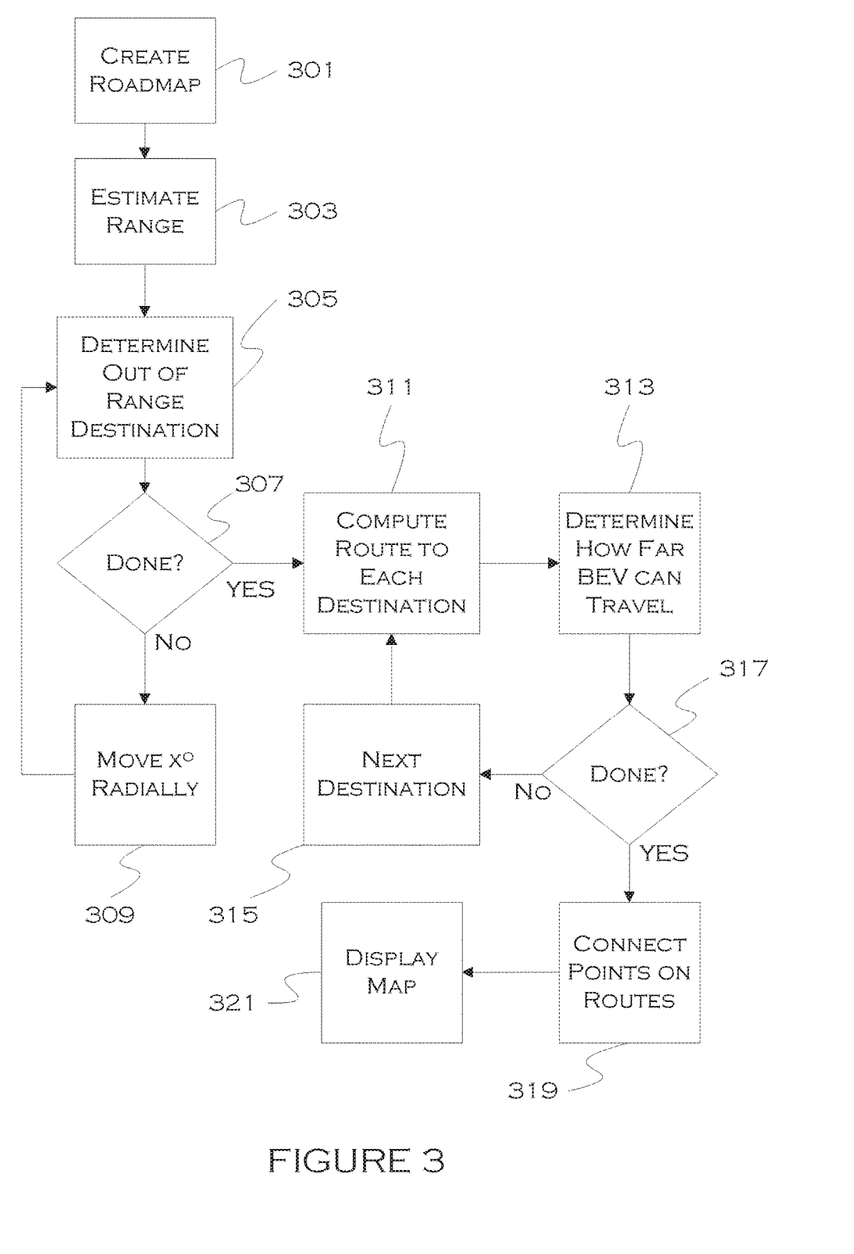
FIG. 3 shows an illustrative example of an estimated point of travel calculation process.

FIG. 3 shows an illustrative example of an estimated point of travel calculation process. This exemplary process shows the estimated range of a BEV on a map, without calculating every possible route the BEV could take. By taking a sampling of some number of points, and connecting the ranges along those points, the process can generally estimate the travelable range of a BEV in most or all directions. For example, in this illustrative embodiment, the process creates a roadmap 301 of roads on which the vehicle may travel. This map can include, for example, some or all roads in a specific direction, heading, or all around the BEV.

Once the roadmap is created, the process will select a starting path traveling in a particular heading from a current BEV location. By estimating the range along that path 303, the process can determine an out of range destination 305 that lies in that direction. This destination will be used as an "end point" in the particular heading chosen.

If the process has completed radial cycling (as explained below) 307, then the process can proceed to mapping out the projected range. If all the projected points have not yet been covered 307, the process moves, for example, x degrees radially 309 and repeats the calculations.

By moving radially and repeating, a general map of the entire surrounding area around the BEV can be generated showing estimated ranges. If there is no major road in the direction selected after a radial move, the process may select a closest road that lies near that heading, or use other suitable criteria (including, for example, merely skipping to the next radian) to select a road along which an estimated destination can be calculated.

Once the process has completed a circle around the vehicle, or, for example, an arc covering a general direction of travel, the process will compute a route to each selected destination 311. These selected destinations are "out of range" destinations representing the edge of the projected travel zone. Once a route is determined, the process can determine how far along that route the BEV can actually travel, based on, for example, remaining power, weather, temperature, traffic, known driving behavior of an identified driver (identifiable by installed vehicle systems), etc.

If the process has completed this determination of travelable distance for all destinations 317, the process can move on. Otherwise, the process will select a next destination 315 and continue to calculate the travelable distances until paths to all destinations have been covered.

Once the process has determined travelable distances relating to all destinations, the process can set a series of points along the routes. One point can correspond to a maximum estimated travelable distance, and other points can correspond to, for example, percentages of travelable distance (e.g., without limitation 90%, 80%, 50%, 45%, etc.). Limits such as 80 or 90 percent may better estimate an "end point" without prematurely running out of power. Limits such as 45 or 50 percent may be useful for representing a reachable destination when a round-trip on a current charge is desired. Other suitable limits may also be set.

Points corresponding to particular ranges may then be connected by the process 319. This creates a map covering the whole area considered by the radial calculation process. Distances between points can be generally reflected by the lines connecting the points, so that a user can approximate where a particular vehicle may be able to travel even if the specific heading was not considered by the calculation process. A map is displayed, showing this information to a driver 321.

Figure 4:
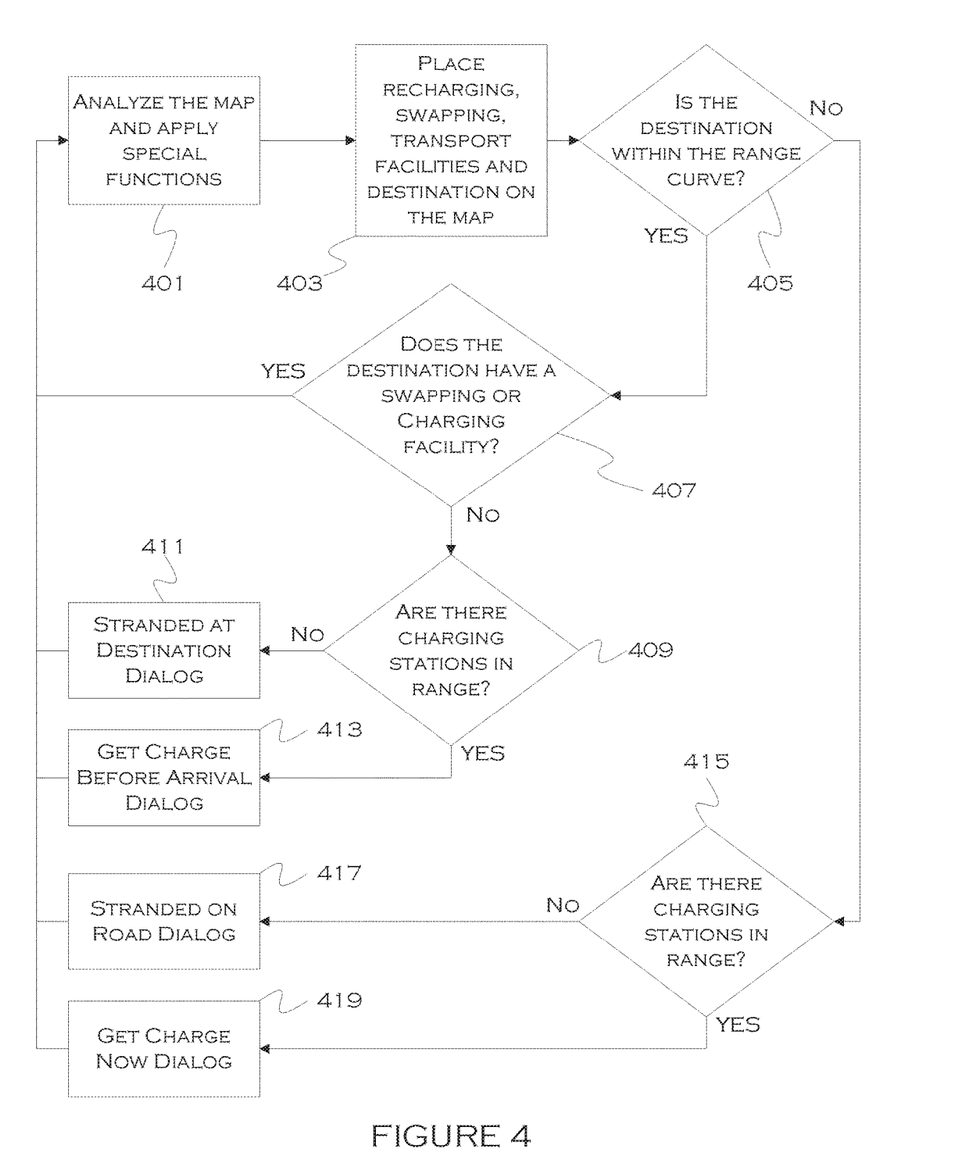
FIG. 4 shows an illustrative example of a driver alert process.

FIG. 4 shows an illustrative example of a driver alert process. In this illustrative example, the process can apply the range curve, as in FIG. 3, to a map of an area surrounding a vehicle 401. Because this represents only some of the information that may be useful to a user, in this embodiment, the process also may display any charging stations that exist within the area defined by the range curve 403. These displays can help the user visually locate charging stations, and can also be used by the process to determine if charging stations are available in a direction of heading or near a destination if one is input.

In this example, the user has input a destination and the process first considers if the input destination is within the range curve 405. If the destination is within the range curve, then it is likely that the user can at least reach the destination without running out of power. The process also checks, however, if there is a charging station located at the destination, because the user would be left in a difficult position if they reached the destination and then had no means to recharge the vehicle, and found themselves without sufficient power to return.

If there is a charging station at the destination 407, the process loops, since the user can presumably reach the destination and recharge. If there is not a charging station at the destination, the process determines if there is a charging station within range 409. In this example, within range means that the station is reachable on a current charge before or after the vehicle reaches the destination (e.g., the user can charge up on the way to the destination or on the way home).

If there are no station within range of the destination (either along the route or reachable after the destination is reached, using a current charge), the process may provide the user with a message notifying the user that they might be stranded at the destination 411, since recharge may not be possible once the destination has been reached. If there are charging stations within range, but none at the destination, the process may inform the user that it would be a good idea to charge the vehicle before reaching the destination 413. If the user wishes to utilize a charge station within range, the process could also make a reservation at this point.

If the destination is not within the range curve, such that it is likely that the user will run out of power prior to reaching the destination, the process may check to see if there are charging stations within range (e.g., along the route, close, but in a different direction, reachable with the current charge, etc.) 415. If there are no stations within range, the process may inform the user that it is likely the user will be stranded on the road 417. This results from the destination being unreachable (as an estimate) and there being no reachable charging stations within range.

If there are charging stations within range, the process may suggest to the user that a charge be obtained at some point before the vehicle runs out of power 419. Reachable charging stations may be identified in this scenario, and reservations at one of the stations can be made by the process if the user so desires.

Figure 5:
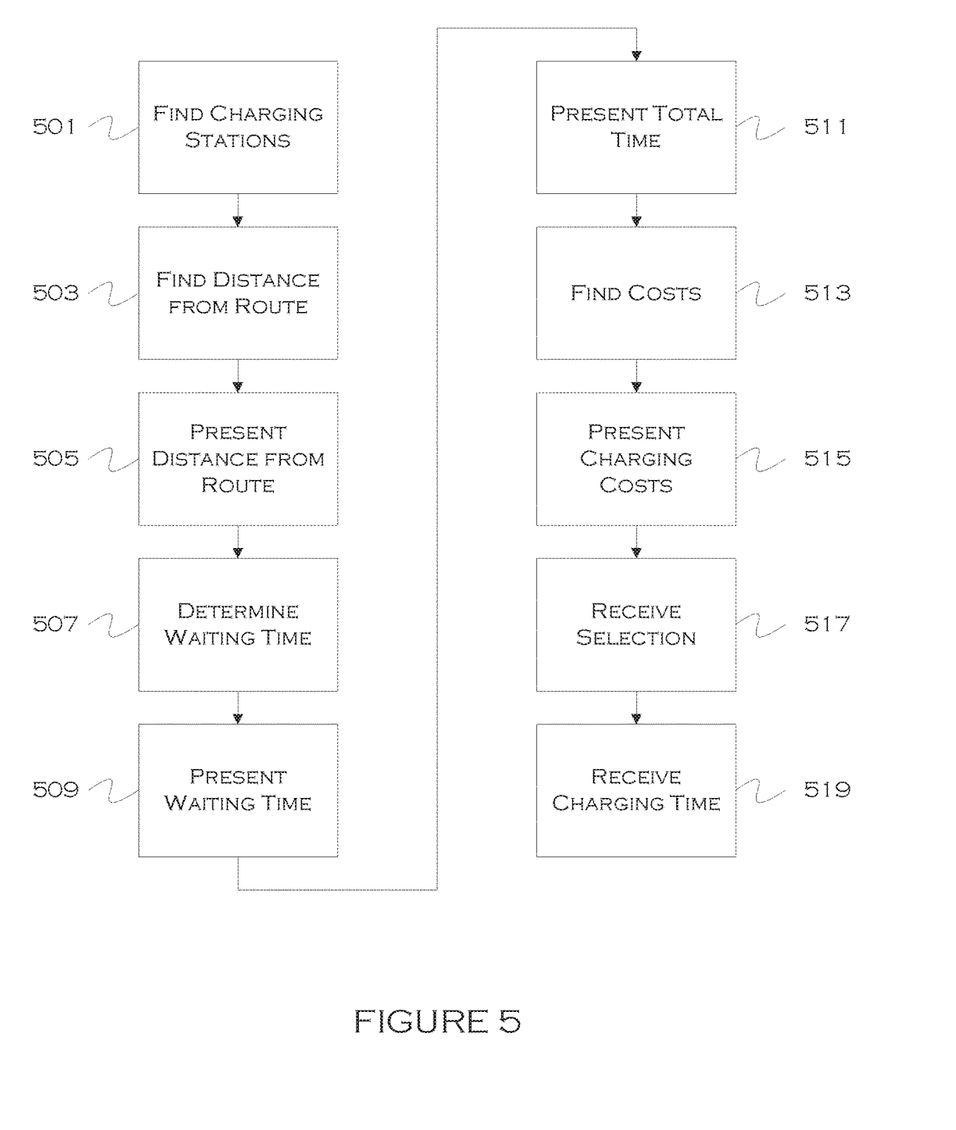
FIG. 5 shows an illustrative example of charging station presentation process.

FIG. 5 shows an illustrative example of charging station presentation process. In this example, one or more charging stations is detected by the process 501. The stations may have suitable criteria to be reached by the vehicle, and may also lie along a current route or heading 503.

Since the user may not want to travel too far from a route (if the user is in a hurry, for example), the process can present the stations showing their respective distances from the route 505, determined based on the route and the station locations 503. For example, a cheaper station may be ten miles off route, but a more expensive station may lie directly along the route. In such an instance, the user may elect which station better suits the user's needs (e.g., save time or save money).

The process also determines a likely waiting time at each station 507. Since stations accept reservations, or may be equipped with monitoring systems that estimate how long current charging bays or battery swap bays may be in use, the process can estimate how long it is likely to take before a user can access an available bay. The waiting time at each station may be presented to the user. This can be useful, for example, if a user selected a closer station to save time. If the closer station actually had a longer wait than the travel time to the further station, the closer station may be no time saver at all. Since charging often takes longer than gas refilling, this is a reasonable possibility. The wait time may be presented to the user 509.

The process can then combine the estimated travel time, recharge time and wait time (or any subset of these factors) and provide an estimated total off-route time to utilize a station 511. The total time can be some subset of all possible time drains as well, for example, wait time may only be an estimate and thus may not be included, since other users can elect to leave before a projected time of departure.

The process will also access information relating to the costs of the various charging stations. Both the wait times and the charging costs associated with stations can be obtained from online databases that may be accessible by vehicles (or servers providing services to vehicles) and which may be updated by the various stations as conditions change. The same systems can be used to contact the various stations to schedule charging.

In this illustrative example, the process receives a user selection of a station 517, as well as a duration that the user would like to charge the vehicle 519. This information can be used to schedule time at the selected station. By calculating travel time to the station and total charging time, and accounting for traffic or other slowdowns, a reasonably accurate appointment for charging can be made. The process can also determine the total amount of power needed to complete a round trip, from a current vehicle position, to a destination, and returning to an identified point, point of origin, current location, etc.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising: a processor configured to: set a point on a digital map projected as being a maximum travelable distance, on a current charge level, by a vehicle in a first direction from a present location; adjust a first direction heading radially by a predefined value; repeat the steps of setting and adjusting until a perimeter surrounding a vehicle location on the map is defined by a line connecting the set points; display the digital map, including the perimeter representing a travelable area, on a vehicle display; and responsive to a destination being outside the travelable area, notify a user that charging may be needed to reach the destination.

2. The system of claim 1, wherein the maximum travelable distance varies based on road speed limits of roads leading to a particular point.

3. The system of claim 1, wherein the maximum travelable distance varies based on the gradient of terrain traveled to reach a particular point.

4. The system of claim 1, wherein the maximum travelable distance varies based on weather conditions covering roads leading to a particular point.

5. The system of claim 4, wherein the weather conditions include wind.

6. The system of claim 5, wherein the maximum travelable distance varies based on vehicle travel direction relative to wind direction.

7. The system of claim 4, wherein the weather conditions include temperature.

8. The system of claim 1, wherein the processor is further configured to display a plurality of charging stations within the represented travelable area and within a predefined proximity to a current route, responsive to an input destination being outside the travelable range.

9. A computer-implemented method comprising: setting points on a digital map as being maximum travelable distances, on a current charge level, by a vehicle in a plurality of headings from a present location, wherein the headings radially vary at predefined radial intervals from each other around a vehicle location, such that a perimeter surrounding the vehicle location on the map is defined by a line connecting the set points; displaying the digital map, including the perimeter representing a travelable area, on a vehicle display; and responsive to a destination being outside the perimeter, notifying a user that charging may be needed to reach the destination.

\* \* \* \* \*